United States Patent [19]

Foster

[11] Patent Number: 4,990,048
[45] Date of Patent: Feb. 5, 1991

[54] APPARATUS FOR COLLECTING AND COMPACTING GARBAGE AND THEN LOADING IT INTO A ROAD VEHICLE

[76] Inventor: Raymond K. Foster, P.O. Box 1, Madras, Oreg. 97741

[21] Appl. No.: 357,094

[22] Filed: May 26, 1989

Related U.S. Application Data

[62] Division of Ser. No. 189,522, May 3, 1988, Pat. No. 4,923,356.

[51] Int. Cl.$^5$ .............................................. B65G 65/02
[52] U.S. Cl. ..................................... 414/398; 100/218; 100/252; 198/750
[58] Field of Search ............... 414/398, 400, 473, 467, 414/491, 501, 502, 507, 518, 525.1, 525, 55, 525.9, 573, 574, 355, 356; 198/750, 468.6, 468.7, 468.9; 100/242, 299 R, 218, 225, 252, 253

[56] References Cited

U.S. PATENT DOCUMENTS

| | | | |
|---|---|---|---|
| 3,294,013 | 12/1966 | Seltzer | 100/252 X |
| 3,513,771 | 5/1970 | Felts | 414/373 X |
| 3,580,166 | 5/1971 | Longo | 100/218 X |
| 4,492,303 | 1/1985 | Foster | 198/750 |
| 4,611,708 | 9/1986 | Foster | 198/750 |

Primary Examiner—Frank E. Werner
Attorney, Agent, or Firm—Delbert J. Barnard

[57] ABSTRACT

A bulk material such as garbage is introduced into a hopper inlet (14) of a compactor (12). A piston (18) in the compactor moves the bulk material out from the compactor (12) into a vault (26). In the vault (26) the material is compacted against a barrier wall (66) until an initial body of compacted material is formed between the inlet and the barrier wall (64). Then, the barrier wall (64) is retracted up into a position substantially within the plane of the top wall (32). Then, the compactor (12) is operated to compact additional bulk material (24) into the vault (26), and at the same time move the material (24) lengthwise through the vault (26). When the vault (26) is sufficiently full of compacted material (24), the vault (26) is expanded for the purpose of enlargening the cross sectional dimension of its inner space. A cargo receiving compartment (30) of a road vehicle (10) is positioned in registry with the outlet of the vault (26). Reciprocating floor conveyors (RF1, RF2) in the vault (26) and the cargo receiving compartment (30) are operated together for moving the body of compacted material (24) out from the vault (26) into the cargo receiving compartment (30) of the road vehicle (10).

11 Claims, 3 Drawing Sheets

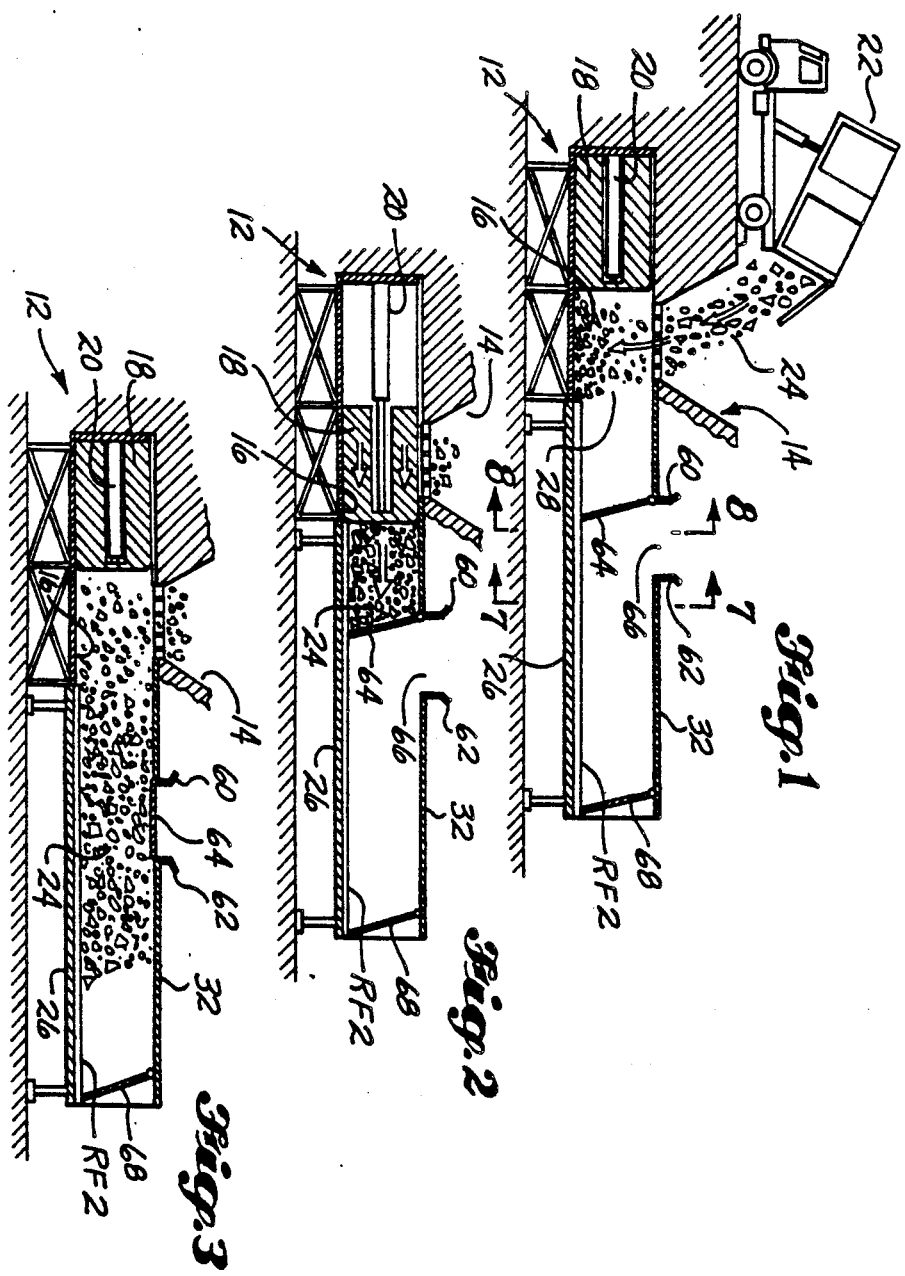

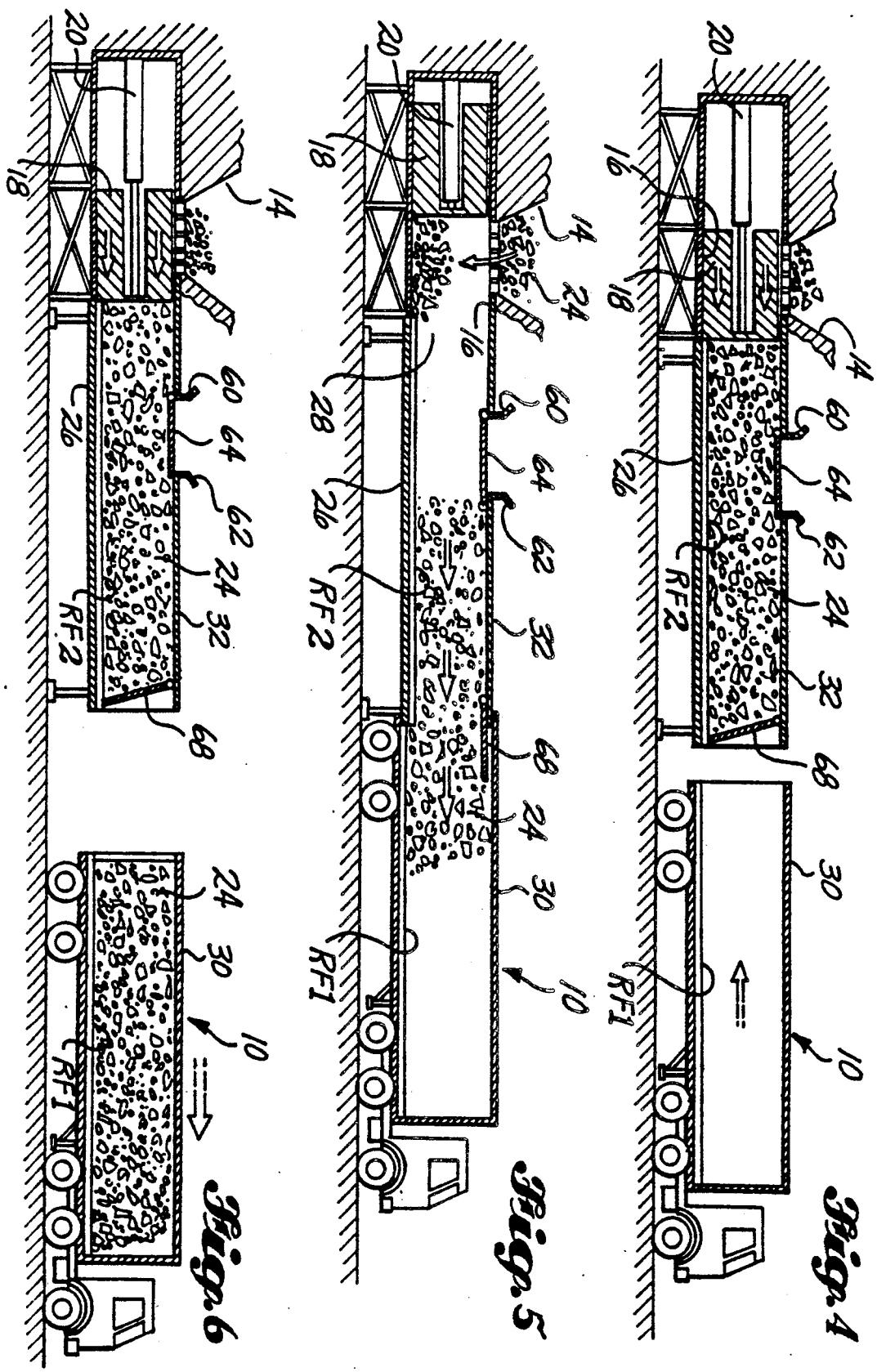

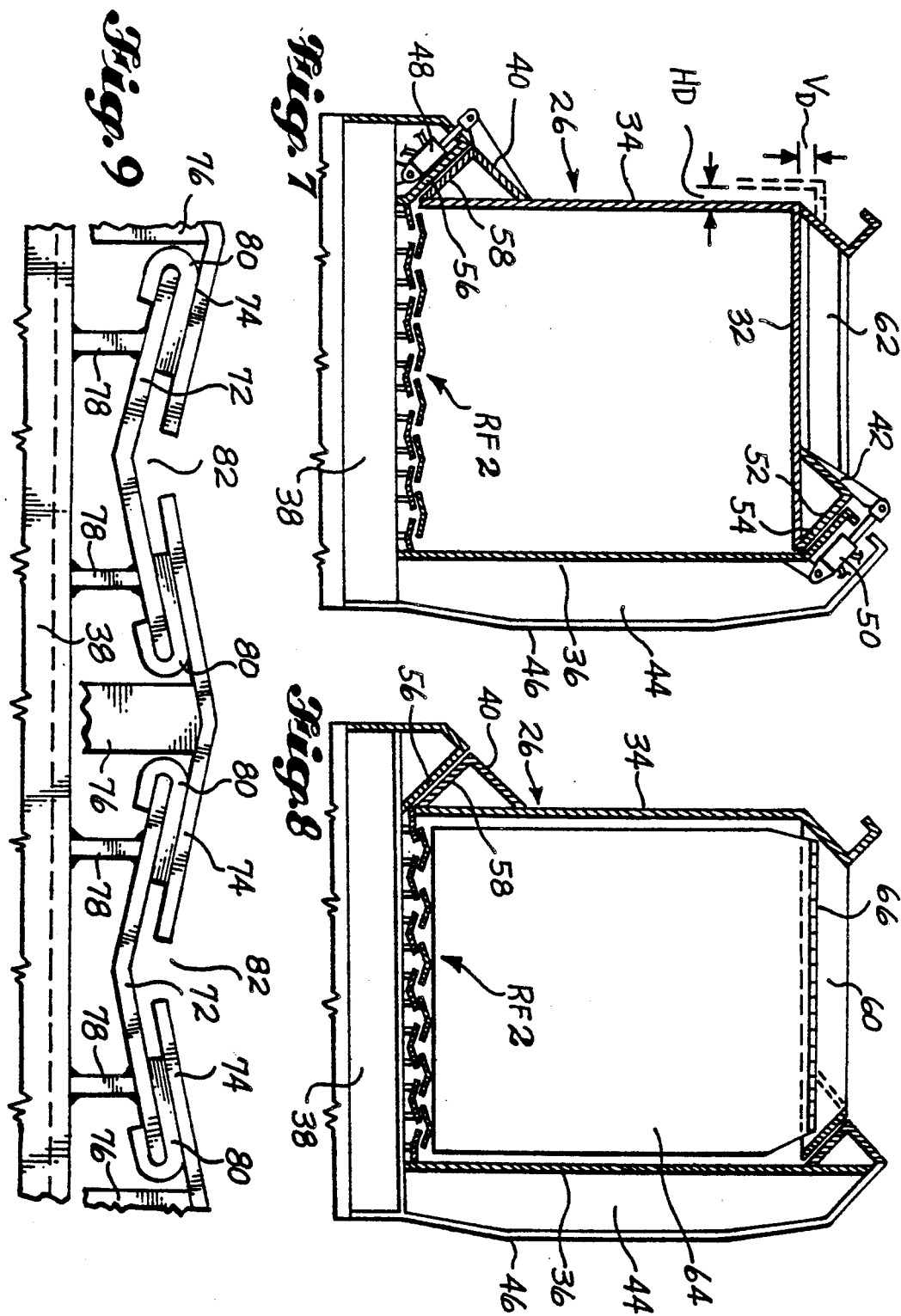

APPARATUS FOR COLLECTING AND COMPACTING GARBAGE AND THEN LOADING IT INTO A ROAD VEHICLE

This application is a divisional of application Ser. No. 07/189,522, filed May 3, 1988 now U.S. Pat. No. 4,923,356.

TECHNICAL FIELD

This invention relates to the handling and transportation of bulk materials such as garbage, and in particular to apparatus for compacting bulk material into a compacted body and then loading the compacted body into a road vehicle.

BACKGROUND ART

My U.S. Pat. No. 4,611,708, granted Sept. 16, 1986, and entitled "Reciprocating Channel Floor Conveyor" discloses and claims a method and apparatus for handling bulk material such as domestic or industrial garbage. The garbage is dumped by garbage trucks onto a reciprocating floor conveyor which delivers it to a receiving container 92. The container is filled in this manner and when full is moved to a land fill or other permanent disposition site. It is also known to provide receiving containers at garbage dump stations (also referred to as "transfer stations") which are in the form of trailers equipped with reciprocating floors. The garbage is dumped into the trailers. When a trailer becomes full, it is connected to a truck which tows it to a permanent disposition site.

It is also known to use a compactor for directly compacting garbage into a trailer. A problem with this practice is that it is necessary to make the trailer compartment which receives the garbage quite strong so that it can withstand the forces applied to it by the compacted garbage. Also, it is necessary to provide such trailer with a movable wall at its front and a telescopic cylinder for moving the wall rearwardly to in that manner push the garbage out from the trailer. Trailers of this type are very expensive and in addition they are very heavy. For example, a forty-five foot trailer may weigh about 26,000 lbs.

The principal object of the present invention is to provide apparatus for compacting bulk material, such as garbage, into a containment vessel, and then loading the compacted body of the material into a lightweight trailer which is of conventional construction except that it is provided with a reciprocating floor conveyor. By way of typical and therefore nonlimitive example, the reciprocating floor conveyor may be of the type disclosed by my copending application Ser. No. 905,370, and entitled "Drive/Frame Assembly for a Reciprocating Floor". The disclosure of application Ser. No. 905,370 is hereby incorporated into this application.

DISCLOSURE OF THE INVENTION

The bulk material handling system of the present invention is basically characterized by a compactor, a vault into which bulk material is compacted which includes a floor in the form of a reciprocating floor conveyor, and a road vehicle which includes a cargo compartment having a floor in the form of a reciprocating floor conveyor. The compactor comprises a piston chamber having an inlet and an outlet, a compaction piston and means for extending and retracting the compaction piston through the piston chamber. The vault is elongated and has an inlet at a first end and an outlet at its second end. In use, the inlet of the vault is in registry with the outlet of the piston chamber. The piston chamber of the compactor is sized and positioned such that an extension of the piston against bulk material in the piston chamber will move such bulk material out from the piston chamber into the vault, to be contained within the vault in an inner space above the reciprocating floor conveyor in the vault. The vault and the cargo receiving compartment of the road vehicle are so dimensioned that when the cargo receiving compartment of the road vehicle is in registry with the outlet of the vault, the reciprocating floor conveyor in the vault is substantially at the same level as the reciprocating floor conveyor in the cargo compartment of the road vehicle, allowing the two reciprocating floor conveyors to be operated together to move compacted material from the vault end of the cargo receiving compartment of the road vehicle.

In preferred form, the vault includes a barrier wall intermediate its length which spans substantially across the interior of the vault. The piston of the compactor is used for pushing bulk material against the barrier wall, to in that manner compact the material between the piston and such wall. According to an aspect of the invention, the barrier wall is retractible upwardly to place it substantially within the general plane of a top wall of the vault.

In preferred form, the vault is divided into upper and lower sections. The upper section comprises a top wall and a first sidewall. The lower section comprises a base portion and a second sidewall. The vault includes means for holding the upper and lower sections together while bulk material is being compacted into the vault, and for then moving the upper section away from the lower section after bulk material has been compacted into the vault. Expansion of the vault in this manner facilitates movement of the compacted material out from the vault and into the cargo compartment of the load vehicle, by operation of the reciprocating floor conveyors.

In preferred form, the means for holding comprises a plurality of double-acting hydraulic cylinders which at their opposite ends are connected to the upper and lower sections of the vault. When retracted these cylinders hold the upper and lower sections together When extended they move the upper section away from the lower section, to in this manner increase the cross sectional dimension of the inner space of the vault.

In use, the barrier wall in the vault is moved into a position spanning across the vault innerspace. Bulk material is delivered into the compactor and the compaction piston is extended to compact the bulk material between it and the barrier wall. The piston is then retracted to allow the placement of more bulk material into the piston chamber. Then, the piston is extended again to compact the additional bulk material. This procedure is repeated until a substantially compacted body of the bulk material is formed within the vault, between the inlet and the barrier wall. Then, the barrier wall is retracted up into a position substantially within the general plane of the top wall of a vault. Then, the compactor is operated to compact additional material into the vault, and to at the same time move the compacted material lengthwise through the vault until it reaches the outlet of the vault. When a sufficient amount of compacted material is within the vault, it is moved out into a cargo receiving compartment of a road vehicle. The cargo receiving compartment is first moved into registry with the outlet of the vault. Then, the reciprocating floor conveyor in the vault and the reciprocating floor conveyor in the cargo compartment of the road vehicle are operated together for the purpose of moving the compacted body of material out from the vault into the cargo receiving compartment of the road vehicle.

In some installations it is desirable or necessary to expand the cross sectional dimension of the vault before moving the material out from the vault into the cargo receiving compartment of the road vehicle.

Other objects, features and advantages of the invention are hereinafter disclosed as a part of the description of the best mode for carrying out the invention.

BRIEF DESCRIPTION OF THE DRAWINGS

Like reference numerals are used to designate like parts throughout the several views of the drawing, and:

FIG. 1 is a side elevational view of a truck in the process of dumping garbage or a similar compactable material into a compactor, showing the compactor positioned to move the material into a reinforced vault;

FIG. 2 is a view like FIG. 1, showing the compactor piston extended to compact the material against a barrier wall or door that is located within the vault;

FIG. 3 is a view like FIGS. 1 and 2, showing the barrier wall swung up into a position at the top of the vault and further showing the compacted body of material advanced partway through the vault;

FIG. 4 is a view like FIGS. 1-3, showing the vault filled with compacted material and further showing a receiving trailer in the process of being backed up to place its open rear end into registry with the discharge end of the vault;

FIG. 5 is a view like FIGS. 1-4, showing a reciprocating floor conveyor in the vault and a reciprocating floor conveyor in the trailer being operated in conjunction to move the body of compacted material from the vault into the trailer;

FIG. 6 is a view like FIGS. 1-5, showing a loaded truck and trailer and another body of compacted material within the load ready to be loaded into another trailer;

FIG. 7 is a sectional view taken through the vault, substantially along line 7—7 of FIG. 1;

FIG. 8 is a sectional view taken through the vault substantially along line 8—8 of FIG. 1; and FIG. 9 is an enlarged scale sectional view of a portion of the reciprocating floor conveyor which forms the bottom of the vault.

BEST MODE FOR CARRYING OUT THE INVENTION

The truck-and-trailer vehicle 10 shown in FIGS. 4-6 may be of the general type shown in FIG. 1 of my U.S. Pat. No. 4,492,303, granted Jan. 8, 1985, and entitled "Drive/Guide System for a Reciprocating Floor Conveyor". It includes a reciprocating floor conveyor RF1. The drive mechanism for the reciprocating floor conveyor RF1 may be of a type disclosed in U.S. Pat. No. 4,492,303, or it may be of the type disclosed in my aforementioned copending application Ser. No. 905,370. The trailer may be provided with closure doors of the type shown in FIG. 1 of U.S. Pat. No. 4,492,303.

The compactor 12 is known per se. It comprises a hopper 14 for receiving compactable bulk material (e.g. garbage), a piston chamber 16, a piston 18 and a double acting hydraulic cylinder 20 for extending and retracting the piston 18. FIG. 1 shows a truck 22 (e.g. a garbage truck) in the process of dumping a compactable bulk material 24 (e.g. domestic or industrial garbage) into the hopper 14. A receiving vault 26, constructed in accordance with the present invention, is shown with its receiving or inlet end 28 in registry with the discharge end of the compactor 12.

The vault 26 and the piston chamber 16 of the compactor 12 are preferably are rectangular in cross section. The piston chamber 16 of the compactor 12 is dimensioned to closely conform in size to the vault 26 and the vault 26 is dimensioned to closely conform in size to the truck 30. The cross sectional dimensions of the piston chamber 16 are preferably smaller than the cross sectional dimensions of the vault 26. The cross sectional dimensions of the vault 26 are preferably smaller than the cross sectional dimensions of the trailer 30.

As shown by FIGS. 7 and 8, the top wall 32 and one side wall 34 of the vault 26 are connected together. The second sidewall 36 and the bottom frame 38 of the vault 26 are connected together. The top wall 32 and the sidewall 34 of vault 26 will be hereinafter sometimes referred to as the upper section of the vault 26. The sidewall 36 and the base structure or frame 38 will be hereinafter sometimes referred to as the lower section of the vault 26. Longitudinal beams 40, 42, which may be triangular in cross section as shown, reinforce the portions of the upper and lower vault section 32, 34 and 36, 38 where they border each other. The base structure 38 is reinforced by a network of beams. The sidewall 36 may be reinforced by strongbacks 44. The strongbacks 44 may comprise a plurality of horizontally spaced apart vertical beams which are attached to the sidewall 36 and the base portion 38. The beams 44 may be flanged at 46. The connection between the strongbacks 44 and the base 38 maintains the wall 36 substantially parallel to the floor of the vault.

As shown by FIG. 7, the upper and lower sections 32, 34 and 36, 38 of the vault 26 may be connected together by double acting hydraulic cylinders 48, 50. A plurality of these cylinders 48, 50 may be spaced apart longitudinally of the vault 26. Each is connected at one end to the upper section 32, 34 and at its opposite end to the lower section 36, 38. The walls 52, 54 are contiguous each other and each extends at a forty-five degree angle from horizontal. In similar fashion, walls 56, 58 are contiguous each other and each extends at a forty-five degree angle to the horizontal. When the cylinders 48, 50 are contracted, the walls 52, 54 substantially touch and the walls 56, 58 substantially touch. The cross sectional shape of the vault 26 is as shown in FIG. 7. The width is preferably slightly narrower than the width of trailer 30 and is preferably slightly wider than the width of piston chamber 16 of compactor 12. The height is preferably slightly shorter than the height of trailer 30 and is preferably slightly higher than the height of piston chamber 16.

When the cylinders 48, 50 are extended the upper section 32, 34 of vault 26 is moved both vertically away from base 38 and horizontally away from wall 36. The horizontal displacement is labeled HD in FIG. 7 and the vertical displacement is labeled VD in the same figure.

Preferably, a pair of beams 60, 62 extend across the top of the upper section 22, 34 and the top wall is open between the beams 60, 62. The beams 60, 62 may be of any suitable form in cross section, e.g. channel, box etc.

A barrier or door 64 is hinge connected at its top, at 66, to a lower portion of beam 60. The barrier 64 is swingable in position between a down position (FIGS.

1, 2, 5 and 8) and an up position (FIGS. 3 and 4). Barrier 64 can be swung between its upper and lower positions by any suitable mechanism. For example, a hydraulic actuator (not shown) which extends through the top opening 66 may connect to the barrier 64 and be used to pull it upwardly into its upper position, move it downwardly into its lower position, and hold or lock it in its lower position.

A second door or barrier 68 is provided at the discharge end of the vault 26. A hinge structure 70 connects the upper end of the door 68 to the top wall 32 in a manner permitting the door 68 to be swung between an upper position substantially against the top 32 and a lower position as shown in FIGS. 1-4. The hinge structure 66, 68 may be constructed like a piano hinge, for example. A hydraulic actuator (not shown) may be used for pivotally moving door 68 between its two positions, and for bracing it into a down position.

Vault 26 is provided with a reciprocating floor conveyor. Preferably, the floor RF2 is similar in principle to the reciprocating floor disclosed by my U.S. Pat. No. 4,611,708, granted Sept. 16, 1986 and entitled "Reciprocating Channel Floor Conveyor". Preferably, floor RF2 comprises elongated guide beams 72 which in cross section have an upwardly opening dihedral shape. The floor members 74 have a dihedral shape cross section and they open downwardly. Vertical members 76 connect the floor members 74 to transverse drive beams (not shown). The illustrated example comprises six floor members 74. These are divided into two sets of three floor members 74 per set. The drive system for the floor RF1 comprises three transverse drive beams and three hydraulic cylinder units, one for each drive beam. The first and fourth floor members 74 are connected to a first transverse drive member. The second and fifth floor members 74 are connected to the second transverse drive member. The third and sixth floor members 74 are connected to the third transverse drive beam. The sequence of operation is identical to the sequence of operation disclosed in my aforementioned U.S. Pat. No. 4,492,303, with reference to FIGS. 2-6 of that patent. Accordingly, the sequence of operation and further details of the floor structure need not be described in this application.

Referring again to FIG. 9, the guide beam 72 may be secured to the base structure 38 by means of vertical plate members 78 having edges welded to the base structure 38 and upper edges welded to the guide beams 72. Bearings 80 constructed from a self-lubricating plastic material may be attached to the side edges of the guide beams 72, as illustrated in FIG. 9. The bearings may be like the bearings 30 disclosed in my aforementioned U.S. Pat. No. 4,611,708.

Spaces 82 exist between adjacent edges of the floor members 74. The bulk material within the vault 26 may fall through the spaces 82. However, the edges of the floor members 74 will grab hold of such material and move it through the vault 26 together with the material on top of the floor members 74.

Referring to FIG. 1, the truck 22 is shown dumping a compactible material 24 (e.g. domestic or industrial garbage) into the hopper 14 of a compactor 12. A quantity of the material 24 is deposited into piston chamber 16 while the compaction piston 18 is retracted. Then, the piston 18 is extended, such as by extension of a power cylinder 20, to move the material 24 out from piston chamber 16 into the vault 26. Initially the barrier wall 64 is in a down position, as shown in FIGS. 1 and 2. The material 24 is compacted in the space defined axially between the piston 18 and the wall 64. When the space is substantially full of compacted material 24, the barrier wall 64 is swung upwardly into a position substantially within the plane of vault top 32 (FIGS. 3-6). Then, the new material 24 that is added is compacted between the piston 18 and the forward body of compacted material 24. As compaction continues, the compacted body of material 24 is advanced forwardly in the vault 26. Compaction and filling of the vault is continued until the compacted material 24 has reached rear door 68 and the vault 26 is substantially full of compacted material 24.

The cargo receiving compartment (e.g. trailer) of a road vehicle 10 is moved into registry with the outlet of the vault 26, either during or following compaction of the material 24 in the vault 26. When it is desired to load the cargo receiving compartment 30, the cylinders 48, 50 are extended so as to expand the inner space of the vault 26. Then, the two reciprocating floor conveyors RF1, RF2 are turned on and used for moving the compacted body of material 24 out from the vault 26 and into the cargo receiving compartment 30 of the road vehicle 10.

In some installations, the inner space of the vault 26 may be expanded in another manner, or expansion may not be necessary. In that case, the reciprocating floor conveyors RF1, RF2 are used for moving the compacted material 24 out from the vault 26 and into the cargo receiving compartment 30 of the road vehicle 10 without any prior expansion of the vault 26.

From the foregoing, various further modifications, component arrangements, and mode of utilization of the system components of the invention will be apparent to those skilled in the art to which the invention is addressed, within the scope of the following claims.

What is claimed is:

1. For use with a compactor for bulk material, a containment and compaction vault adapted to receive bulk material from the comparator, for further compaction into a compacted body and then delivery on to a receiver, said vault comprising:

a pair of spaced apart sidewalls, a top wall and a base portion, said top wall, said sidewalls and said base portion together defining a chamber having an inlet at one end of the vault in through which bulk material is received from said compactor and an outlet for delivery of material to said receiver;

a barrier wall within the chamber between the inlet and outlet, said barrier wall being movable between a down position in which it extends substantially across the chamber, and a retracted up position, enabling the barrier wall to be in its down position when bulk material is first being delivered into said chamber, so that the bulk material will be further compacted against said wall to form a leading end portion of the compacted body of bulk material, said barrier wall when in its retracted position being positioned to allow forward movement of the compacted body of bulk material through the chamber in response to introduction of additional bulk material into the chamber;

said base portion including a reciprocating floor conveyor which forms a floor for the chamber, said reciprocating floor conveyor comprising floor slat members movable towards the outlet to convey the material in the chamber towards the outlet and retractable back towards the inlet to bring the floor slat members back to a start position at the inlet; and means for moving said slat members.

2. For use with a compactor for bulk material, a containment and compaction vault adapted to receive bulk material from the compactor, for further compaction into a compacted body and then delivery on to a receiver, said vault comprising:

a plurality of horizontally elongated vault sections together defining a pair of spaced apart sidewalls, a top wall and a base portion, said top wall, said sidewalls and said base portion together defining a chamber having an inlet at one end of the vault in through which bulk material is received from said compactor and an outlet for delivery of material to said receiver, said base portion including a reciprocating floor conveyor which forms a floor for the chamber, said reciprocating floor conveyor comprising floor slat members movable towards the outlet to convey the material in the chamber towards the outlet and retractable back towards the inlet to bring the floor slat members back to a start position at the inlet;

means for moving said slat members;

means for holding the vault sections together while bulk material is being moved from said compactor into the vault and compacted further in the vault into a compacted body, and then moving the vault sections laterally apart for the purpose of expanding the cross-sectional dimension of the chamber, so as to relieve wall pressure on the compacted body, to facilitate operation of the reciprocating floor conveyor for moving the compacted body out from the vault, through the outlet of the chamber, onto said receiver for such compacted body of bulk material.

3. A containment vault according to claim 2, further comprising a barrier wall within the chamber between the inlet and outlet, said barrier wall being movable between a down position in which it extends substantially across the chamber, and a retracted up position, enabling the barrier wall to be in its down position when bulk material is first being delivered into said vault, so that the bulk material will be compacted against said wall to form a leading end portion of the compacted body of bulk material, said barrier wall when in its retracted position being positioned to allow forward movement of the compacted body of bulk material through the vault in response to introduction of additional bulk material into the vault.

4. A containment vault according to claim 3, comprising two sections, wherein the top wall and one sidewall of the vault form a first upper section, and the second sidewall and the base portion of the vault together form a second lower section of the vault.

5. A containment vault according to claim 4, wherein said means for holding and moving comprises a plurality of double acting hydraulic cylinders which are interconnected between the upper and lower sections of a vault, and which when retracted hold the upper and lower sections together, and when extended move the upper section away from the lower section, to increase the cross-sectional dimension of the chamber.

6. A containment vault according to claim 5, wherein the hydraulic cylinders are oriented to move the upper section of the vault diagonally toward and away from the lower section of the vault.

7. A containment vault according to claim 6, further comprising guide means for guiding the upper section of the vault for diagonal movement towards and away from the lower section of the vault.

8. A containment vault according to claim 4, wherein said second section of the vault comprises vertical strongback beams extending upwardly along the second sidewall, said beams having lower ends connected to the base portion of the vault.

9. A containment vault according to claim 8, wherein the first section of the containment vault includes a first longitudinal beam extending along a lower portion of the sidewall of said first section adjacent the base portion of the second section of the vault, and a second longitudinal beam extending along the top wall adjacent the sidewall of the second section of the vault.

10. A containment vault according to claim 9, wherein said longitudinal beams are tubular beams and each comprise a diagonal sidewall, said diagonal sidewalls being parallel to each other, and wherein the lower section of the vault comprises a pair of diagonal walls, one adjacent each of the diagonal walls of the first vault section, said diagonal walls on the second vault sections defining a diagonal path of movement through which the first vault section is movable relative to the second vault section.

11. A containment vault according to claim 10, wherein said means for holding and moving comprises a plurality of double acting hydraulic cylinders which are interconnected between the upper and lower sections of the vault, and which when retracted hold the upper and lower sections together, and when extended move the upper section away from the lower section, to increase the cross-sectional dimension of the chamber.

* * * * *

UNITED STATES PATENT AND TRADEMARK OFFICE
CERTIFICATE OF CORRECTION

PATENT NO. : 4,990,048
DATED : February 5, 1991
INVENTOR(S) : R. Keith Foster

It is certified that error appears in the above-identified patent and that said Letters Patent is hereby corrected as shown below:

Column 1, lines 52 and 53, after "905,370", insert --now U.S. Patent No. 4,821,868, issued April 18, 1989. --

Column 2, line 44, there is a period after "together".

Claim 1, col. 6, line 40, "comparator" should be -- compactor --.

Signed and Sealed this

Twenty-second Day of September, 1992

Attest:

DOUGLAS B. COMER

*Attesting Officer*     *Acting Commissioner of Patents and Trademarks*